United States Patent [19]

Pfeffer

[11] Patent Number: 4,749,532

[45] Date of Patent: Jun. 7, 1988

[54] METHOD OF AND APPARATUS FOR FABRICATION OF AN INSULATED FLUID STORAGE UNIT

[75] Inventor: John D. Pfeffer, Brookfield, Wis.

[73] Assignee: A. O. Smith Corporation, Milwaukee, Wis.

[21] Appl. No.: 28,474

[22] Filed: Mar. 20, 1987

[51] Int. Cl.[4] .............................................. B29C 65/00
[52] U.S. Cl. ................... 264/46.5; 264/45.3; 264/46.7; 264/46.6; 264/46.9; 264/257; 264/261; 264/267
[58] Field of Search ................. 264/46.5, 46.6, 46.7, 264/46.9, 45.3, 257, 261, 267

[56] References Cited

U.S. PATENT DOCUMENTS

| | | | |
|---|---|---|---|
| 3,446,881 | 5/1969 | Poole | 264/46.5 |
| 4,107,833 | 8/1978 | Knight et al. | 264/46.5 |
| 4,240,999 | 2/1980 | Decker | 264/46.5 |
| 4,632,792 | 12/1986 | Clark | 264/46.6 |

*Primary Examiner*—Samuel Scott
*Assistant Examiner*—Noah Kamen
*Attorney, Agent, or Firm*—Andrus, Sceales, Starke & Sawall

[57] ABSTRACT

A hot water heater includes a storage tank and an outer decorative shell spaced from the tank. A foam insulation fills a cavity between the tank and the shell and a bottom wall in the form of preassembled fiberglass belt. The belt is wrapped and secured about to the tank by an encircling compressing and centrally located band. The outer ends of the belts flare outwardly to a diameter in excess of the inner diameter of the shell. A flat, flexible plastic sheet has a narrow portion draped over the top of the tank and sides extended down and overlap the opposite sides of the belt. The lower ends of the sheet essentially covers the belt. The flexible plastic sheet has a slight angle between the tank top and the belt. The outer shell which has a diameter somewhat less than that of the flared belt is telescoped downwardly over the tank and sheet folds the apron into a circular configuration, compressing the belt tightly between the storage tank and the shell. The apron is then removed by grasping the top end and pulling longitudinally outwardly. The compressed fiberglass readily expands to maintain a firm seal with the adjacent shell after removal of the apron. Foam insulation material is then introduced into the cavity, and enters into and is interconnected with the fiberglass belt.

19 Claims, 3 Drawing Sheets

U.S. Patent  Jun. 7, 1988  Sheet 1 of 3  4,749,532
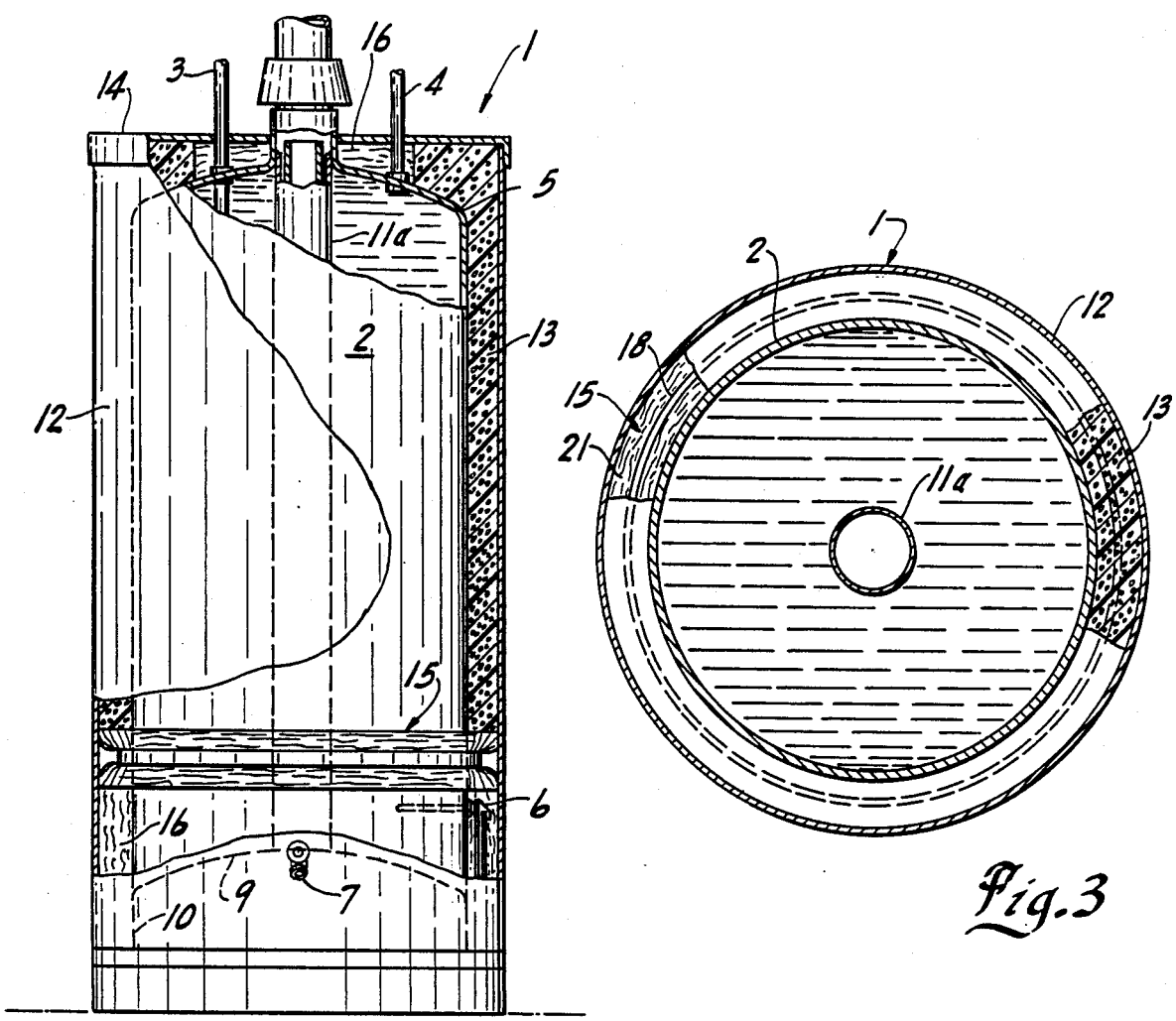
Fig.1
Fig.3
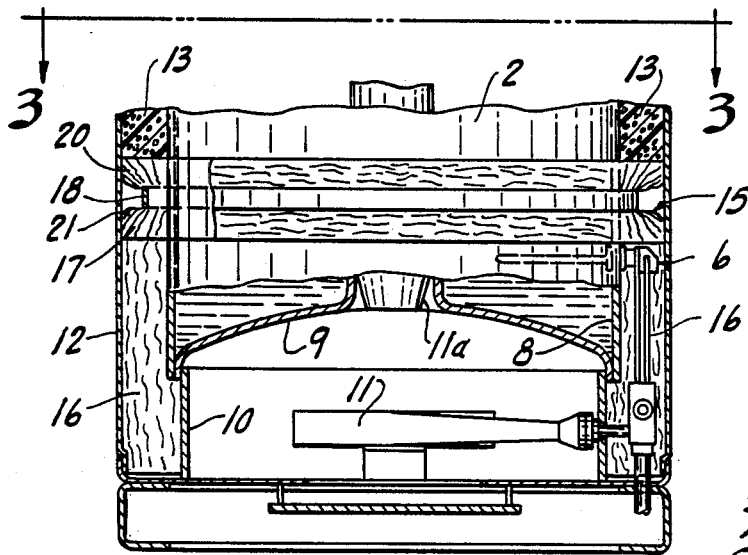
Fig.2

METHOD OF AND APPARATUS FOR FABRICATION OF AN INSULATED FLUID STORAGE UNIT

BACKGROUND OF THE PRESENT INVENTION

This invention relates to a method of and apparatus for fabrication of an insulated fluid storage unit and particularly a hot water unit, and in particular to a tank type hot water heater unit having an outer insulation within an outer shell.

Hot water heaters for domestic and other applications generally include an inner storage tank having an associated heating unit for heating of the water in the storage tank. The tank is enclosed within suitable insulation to retain the heat and minimize the necessity for frequent reheating. In other applications, a storage tank for cold or hot material or the like may be insulated to retain the heat or prevent heat from passing into the material. In a hot water heater unit, for example, an outer esthetically pleasing shell or housing may be provided to enclose the insulation, depending upon the application and usuage.

A highly satisfactory insulating material is an expandable insulation such as an expanded foamed polyurethane. The insulation can be applied in a fluid or semi-fluid state and foamed to produce a rigid and closely adhering insulating enclosure about the inner tank. U.S. Pat. No. 3,253,731, issued May 31, 1966, entitled "Hot Water Storage Tanks", discloses a hot water heater in which the storage tank is insulated with a foamed insulation.

The inventors copending application entitled "Insulated Fluid Storage Unit And Method Of Fabrication" which was filed on the date of this application discloses a particularly satisfactory polyurethane foam insulated hot water heater unit.

Water heaters are often provided with a gas burner aligned with the bottom of the storage tank for heating of the water within the storage tank. In gas fired units, a firing chamber is secured extending downwardly from the bottom of the storage tank, generally with encircling insulation about the gas firing chamber. Polyurethane, when burned, produces toxic fumes. As more fully discussed in the above patent, foamed polyurethane insulation must be protected from the direct temperature of the heating units.

In-situ application of the insulation to the tank therefore requires provision of appropriate confining wall means and various systems as discussed in the inventors above identified application. Generally, the outer shell is telescoped over the tank and sealing twice then located between the shell and tank to define the bottom cavity wall. An inflatable bag member may be inserted between a lower end of the shell and tank and inflated to form the bottom wall of the insulating cavity with the opposed walls of the tank and shell. The bag seals the cavity and foam insulation material is applied in a semi-liquid state with a foaming additive, causing the material to expand and fill all voids within the cavity. Typical systems for inserting a foamed insulation using an inflatable confining bag are shown for example in U.S. Pat. No. 4,372,028, issued Feb. 8, 1983, entitled "Method Of Manufacturing Foam Insulated Tank", and U.S. Pat. No. 4,477,399, issued Oct. 16, 1984, entitled "Method And Apparatus For Manufacturing A Foam Insulated Water Heater".

An alternative method of applying a foamed insulation uses an envelope inserted between the preassembled storage tank and outer shell. Foam insulation is introduced into the envelope and expands within the envelope to fill the voids therein and produces the insulating jacket about the tank. Envelope type structures are shown in U.S. Pat. No. 4,447,377, issued May 8, 1984, and entitled "Method Of Insulating The Exterior Of A Water Heater Tank "and U.S. Pat. No. 4,527,543, issued July 9, 1985, and entitled "Water Heater Construction" wherein a multilayer fiberglass belt is clamped about a tank to form the bottom wall of the insulation cavity.

In a commercial structure, the assignee of this application has built foam insulated hot water heaters using a flexible polyurethane dam member forming the bottom wall of the cavity. In the commercial system, a pair of heavy metal plates, each generally corresponding to half of the inner tank were provided. The half members were formed with curved configurations and domed upper ends. The heavy metal members were interconnected at the top of a suitable linkage and coupled to a power hoist mechanism for alignment with a heater tank. The interconnecting members were thus generally in the form of a clam-shell structure. The tank was formed with an encircling polyurethane belt which was adhesively bonded to the tank. Two workmen were provided and each moved one of the clam shells outwardly as the clam-shell unit was dropped downwardly over the tank by the hoist. The shells were released to drop onto and compress the polyurethane belt. The hoist was then disconnected from the clam and the shell rested on the tank. The hoist was removed, and rested over the tank to receive the outer heater shell, after which the hoist was returned and the heavy metal clam-shell unit removed, thereby establishing the cavity for receiving of the foam insulation.

The prior art foamed insulation systems for hot water heaters thus have been suggested and even used in commercial applications, the requirement of the special inflatable structures and/or envelope type devices require careful attention and application, and may materially add to the cost of the heater structure and the fabrication of the heater.

SUMMARY OF THE PRESENT INVENTION

The present invention is particularly directed to an improved, simple, reliable and relatively low cost means and method of fabricating a formed insulated storage unit and particularly including the preassembly of the tank with an encircling dam means which is compressed or deformed between the shell and tank to form the bottom wall of the insulation cavity. As disclosed in the inventors above corresponding application, the dam means is preferably an encircling belt unit formed of an essentially continuous solid material having a noticeable elasticity and in a particularly practical system is a fiberglass or similar high temperature insulating fibrous belt affixed between the opposed sidewalls of the tank and shell. In assembly, the belt unit is secured to the tank at the appropriate heighth with an outer diameter greater than that of the shell prior to assembly of the shell. The belt unit is preferably a multiple layered fiberglass belt of a substantial width and is secured to the storage tank wall. The thickness of the belt is such that the outer diameter surface may be significantly greater than the internal diameter of the shell. In accordance with the invention, a low friction guide member is located over the tank engaging opposite sides of the belt. A preformed outer tubular shell is telescoped over the guide member and telescoped over the belt and the tank, and thereby appropriately aligned with the storage tank to directly define the insulation chamber or cavity between the opposed sidewalls of the tank and the shell and the belt unit which engages the adjacent wall surfaces to form a seal at the end of the cavity. The guide member is then preferably physically removed by pulling thereof from the location between the belt unit and the shell, with the belt unit filling the space of the guide member to maintain the seal. The expandable insulating material is then introduced into the cavity defined by the tank, the shell and the belt. The foam material enters into the area of the cavity immediately adjacent the belt and is interconnected with the fiberglass belt. Thus, the typical fiberglass insulation is a layered type material and provides openings into which the foam material extends and expands.

The use of the guide member permits the use of a relatively large mass of a fiberglass belt and fully ensures a tight seal at the lower end of the cavity. This is particularly important where the use of a high pressure foam insulation injection system is used to ensure that the injected insulation does not move past the belt. The assembly of the shell onto the belt compresses the insulation to form the desired seal at the belt connection. The combination of the preformed shell and the guide member thus creating reasonably a high pressure fit between the belt, the shell and the tank.

The usual high pressure application of a foaming insulation at the known pressure of 3000 psi (pounds per square inch) should not be impressed directly on the fibrous belt and where such high pressure is used some buffering means is advantageously placed between the insulation injection unit and the belt.

In a preferred method, a fiberglass belt is formed of a conventional multiple layered fiberglass batt of a selected length. The fiberglass belt is wrapped around the tank and secured to the tank by a band encircling the central portion of the belt and compressing the central portion of the belt to firmly secure the belt in location. The outer end of the belts flare outwardly somewhat and defines an outer diameter larger than the inner diameter of the shell. An apron-shaped member in form of a flat, flexible sheet having a low coefficient of friction such as a plastic having a narrow portion draped over the top of the storage tank. The lower ends of the guide member overlaps the opposite sides of the belt. The width of the lower ends of the guide member is such that the circumference of the belt is essentially covered. The flexible plastic member of course extends from the end of the tank downwardly at a slight angle to the belt. The outer shell which has a diameter somewhat less than that of the flared belt is telescoped downwardly over the storage tank and the guide member. As the shell moves downwardly, it folds the apron into a circular configuration about the storage tank, with the lower end correspondingly positioned around the fiberglass belt. The inclined guide member guides the shell over the belt, compressing the belt tightly between the storage tank and the shell. The apron is readily removed by grasping of the end at the tank end and pulling longitudinally outwardly. The compressed fiberglass readily expands to maintain a firm seal with the adjacent shell after removal of the apron.

The present invention has been particularly developed using the fiberglass belt and is described with such material. Any other suitable corresponding high temperature insulation of a compressible or deformable medium or construction may be used in the broadest aspect of the present invention. However, the multiple layered fiberglass material has been found to provide an exceptionally reliable, effective and inexpensive material.

The present invention has been found to provide a simple, reliable and practical method and system for applying foam insulation to and about a hot water storage tank.

BRIEF DESCRIPTION OF DRAWINGS

The drawings furnished herewith illustrate a best mode presently contemplated by the inventor in carrying out the invention.

In the drawings:

FIG. 1 is a side elevational view of a gas fired hot water heater with parts broken away and sectioned to show certain inner details of construction;

FIG. 2 is a fragmentary enlarged side elevational view of a storage tank shown in FIG. 1;

FIG. 3 is a cross-sectional view taken generally on line 3—3 of FIG. 2, with parts broken away and sectioned to show certain details of construction;

DESCRIPTION OF THE ILLUSTRATED EMBODIMENT

Figure 4:
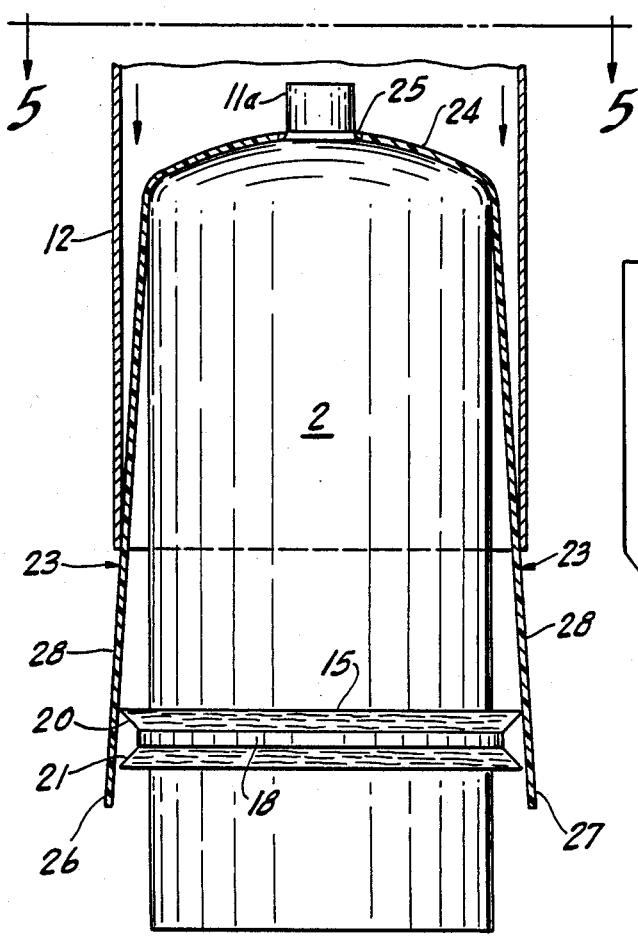
FIG. 4 is a view illustrating the assembly of the outer decorative shell about the storage tank shown in FIG. 2.

Referring to the drawings and particularly to FIG. 1, a gas fired hot water heater unit 1 is illustrated corresponding to that shown and claimed in the previously identified application, the unit 1 includes an inner hot water storage tank 2 which is formed of a suitable metal. The tank 2 is essentially closed having water inlet and outlet connections 3 and 4 at a domed top wall 5. A thermocouple connection 6 and a drain connection 7 are provided in the sidewall 8 of the tank 2 immediately above the bottom wall 9 of the tank 2. An integrated bottom extension 10 of the tank sidewall projects downwardly and defines a firebox or chamber within which a gas fired burner unit 11 is suitably mounted. The burner unit 11 is fired to heat the water within the tank 2 and provides a continuous source of heated water to the consumer. A flue duct 11a is mounted centrally of tank 2 and extends from the top wall 5.

An outer esthetically pleasing jacket or shell 12 formed of relatively thin metal or other suitable material is secured in outwardly spaced relation to the tank 2 and firebox extension 11. The shell 12 is mounted in spaced relation to the tank 2 by an insulation 13 which fills the space between the shell and the tank 2 and adheres to the respective surfaces. The insulation 13 extends upwardly over the top wall 5 of the tank 2. A shell cover 14 is secured to the top of shell 12 and maintains an asthetically pleasing outer enclosure of the cover and defines an upper space which is filled with insulation 13.

The insulation 13 is, in a practical, commercial production, formed from an expanding material such as a foamable polyurethane which is cast in place directly within the cavity between the shell 12 and the storage tank 2 including the upper top shell cover 14. The insulation 13 is shown extending downwardly about the storage tank 2 to a location immediately above the thermocouple connector 6. The lower end of the insulation 13 is defined by an encircling fiberglass belt 15, which in a practice implementation was a fiberglass belting compressed between the outer shell 12 and the storage tank 2. The fiberglass belt 15 is a high temperature insulating element. The belt 15 holds the insulation 13 in spaced relation to the high temperature burner unit 11 and the firebox extension 10. This is important where foaming polyurethane or other suitable expandable material is used for a gas fired hot water heater to fill the cavity. Thus, the spacing prevents the ignition of the insulation which can create toxic gases upon burning. A conventional fiberglass belt 16 may encircle the firebox extension 10 between the firebox and the lower end of the shell 12 in accordance with conventional practice.

The insulation 13 is preferably a foamed in place material which is normally injected under pressure and may tend to move downwardly between the interfaces between the fiberglass insulation belt 15 and the shell 12 and the storage tank 2. The system is constructed and fabricated specially with the fiberglass belt 15 under compression to minimize such interface movement and positively prevent such movement downwardly into the area of the firebox where actual burning or scorching of the insulation might occur.

A preferred method of fabrication is more fully illustrated in FIGS. 2–6.

Referring particularly to FIG. 2, the storage tank 2 is constructed in accordance with conventional practice. The fiberglass belt 15 is formed with a significant width and is wrapped about the tank.

Figure 7:
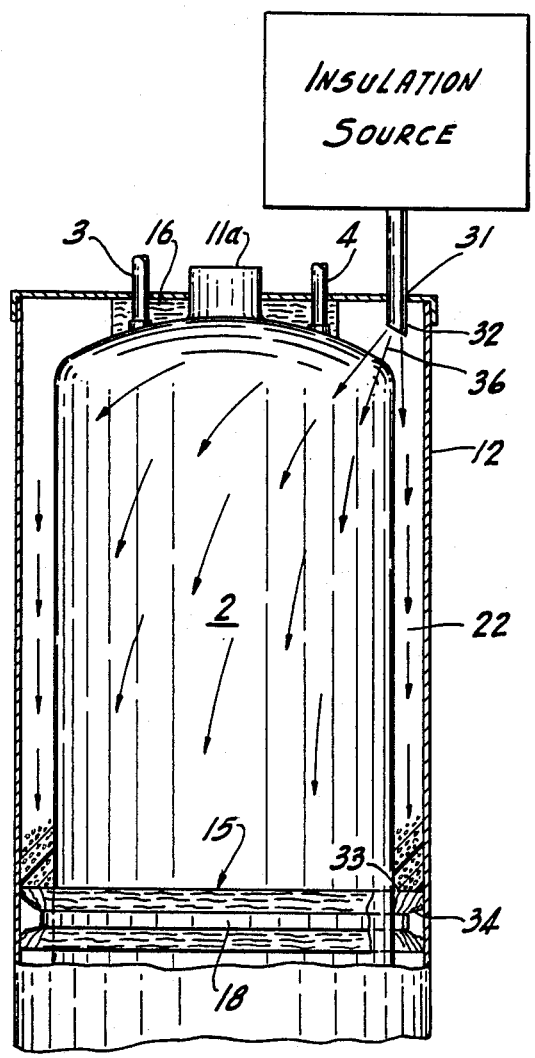
FIG. 7 is a view illustrating the application of the insulation.

In the illustrated embodiment of the invention, the fiberglass insulation belt 15 is formed of a conventional multiple layer fiberglass batt including a plurality of layers 17 of fiberglass fibers. The layers 17 are essentially parallel to the tank wall 8. The belt 15 is held to the tank by an encircling band 18 wrapped about the central portion of the fiberglass belt 15. The fiberglass may be typically that employed in water heater insulation or even a higher temperatured fiberglass, such as that presently used in gas fired cooking ranges. Although the width of the fiberglass belt 15 is not critical, the width should be selected to ensure complete isolation of the foam insulation within the fiberglass to maintain a complete fiberglass insulation bottom wall. A belt having a width of 4–6 inches has been found particularly practical. Similarly, the depth or thickness of the fiberglass belt is not critical, but once again should be of a sufficient thickness to completely fill the gap or space under pressure between the shell 12 and the tank 2. Again, a depth or thickness of approximately 2–6 inches has been found to be particularly satisfactory in domestic water heater constructions. The fiberglass belt 15 is secured in place to the storage tank 2 by the encircling band 18. As illustrated, the band 18 is tightly drawn about the center portion of the fiberglass belt 15. The width of the band 18 is only a small portion of the width of the belt and serves to secure the belt in place with the ends of the belt flared outwardly of the band 18 to the opposite sides thereof as at 20 and 21 in FIG. 2. The fiberglass belt 15 is of course secured to the tank wall at its final position and defines the bottom wall of a foam insulation cavity 22 upon assembly of shell 12, as shown in FIG. 7. In the illustrated embodiment of the invention, the belt 15 is located immediately above the thermocouple attachment connector 6. This eliminates the necessity for separate insulation of the thermocouple and drain connectors 6–7 and provides simplicity in fabrication. This also locates the bottom end of the foam insulation 13 closely adjacent to the bottom wall 9 of the storage tank 2. If, of course, maximum insulation and retention of heat is desired, the belt can be dropped somewhat to further increase the length of the foam insulation about the tank, with proper isolation of the connectors 6–7 to permit the mounting of such components.

Figure 5:
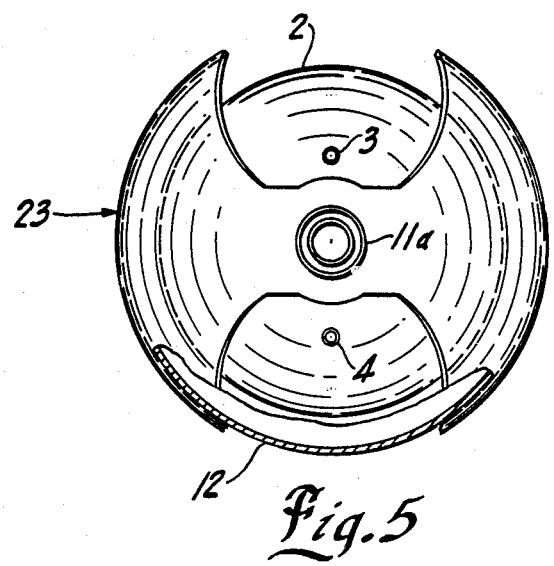
FIG. 5 is a top view of the storage tank as shown in FIG. 4.

After assembly of the banded-fiberglass belt 15, an apron 23 is draped over the tank 2 with opposite similar sidewall portions depending downwardly at least to cover the fiberglass belt, and preferably slightly below the belt 15. The apron 23 is a relatively thin, flexible member having substantially smooth surfaces. The apron 23 is constructed and functions as a guide for telescoping of the outer shell 12 over the belted storage tank 2 and particularly the fiberglass belt 15, as shown in FIG. 4. The insulation belt 15, particularly as attached by the band, has the flared outer ends 20 and 21 located substantially outwardly of the final location of the shell 12 about the tank 2. Thus, if the shell 12 were placed directly over the belted storage tank 2 and belt 15, the end of shell 12 would engage the belt and tend to disrupt and draw the insulation 20–21 downwardly over the belt 15. This would not only make it difficult to assembly the shell 2, but would not permit repeatable fiberglass belt structure in fabrication of hot water heater units. The apron 23, however, assures that as the shell 12 moves downwardly over the storage tank 2, the apron 23 is forced about the belt 15 to tightly compress the belt and allow the shell 12 to move smoothly over the storage tank 2 and belt 15, as shown in FIGS. 4 and 5.

The apron 23 can be formed of any suitable material and in any desired configuration which will provide sufficient overlap to permit insertion of the tubular pre-formed shell and the compression of the belt.

Figure 6:
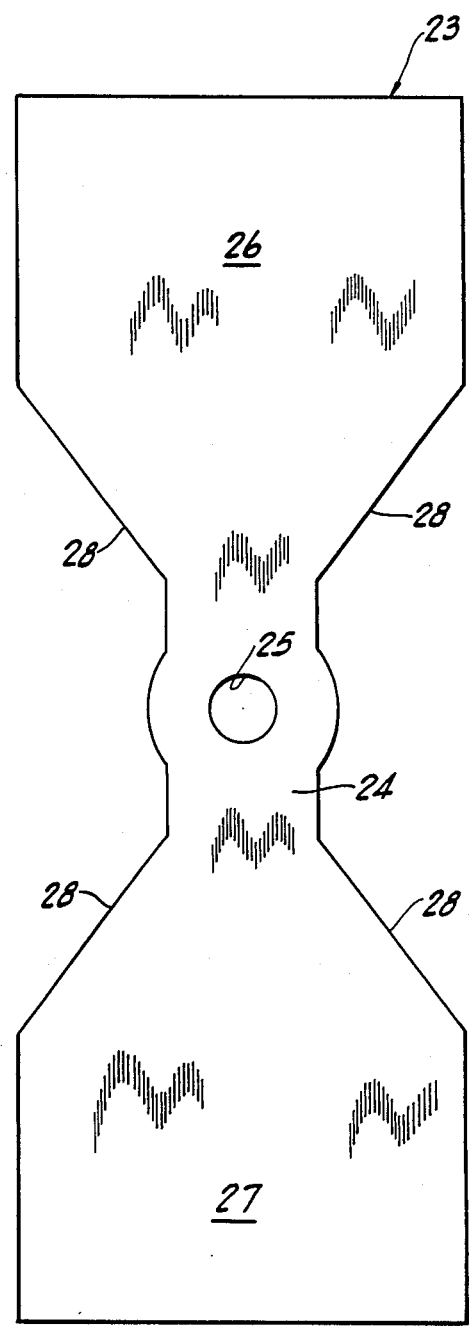
FIG. 6 is a plan view of a shell guide member shown in FIGS. 4 and 5.

A practical apron construction is shown in FIG. 6. The apron 23 is formed of suitable plastic material, such as a Kydex (Trademark of Rohm & Haas), in the form of 0.028" sheeting. The sheeting is formed with a central neck portion 24 having a central opening 25 for mating with the tubular flue 11a of the gas fired storage heater. The neck portion 24 is shown as a relatively narrow portion which drapes downwardly from the central top portion of the storage tank downwardly along the sides of the storage tank 2. The lower end of the apron 23 includes laterally enlarged members 26 and 27 integrally formed with the neck portion 24, which may be interconnected thereto by generally inclined wall portions 28. Apron 23 is applied to the storage tank 2 and the outer shell 12 is telescoped downwardly over the apron 23. The neck portion 24 guides the shell downwardly onto the enlarged belt portions 26 and 27. When the shell engages the inclined wall portion 28, the enlarged members 26–27 fold about the tank and particularly about and in engagement with the fiberglass belt 15. The shell 12 compresses the fiberglass belt 15 and defines a essentially continuous bottom wall sealed to the shell 12 and the storage tank 2.

After the assembly of the outer shell 12 to the belted storage tank 2, the apron 23 is preferably removed. As previously noted, the apron 23 is formed of a relatively thin material and has smooth outer surfaces. The apron 23 may thus be readily removed by grasping of the top end of neck portion 24 and pulling vertically or axially outwardly of the shell 12 and tank 2. The fiberglass belt 15 expands outwardly as the apron 23 is removed to seal against the shell 12 and establish the bottom wall of the cavity 22.

The compression of the fiberglass belt 15 by the shell 12 is less than a total compaction of the fiberglass, such as generally provided by the clamping band 18. Thus, the fiberglass belt 15 projects outwardly from the band into firm sealing engagement with the wall of shell 12 and with the opposed wall of storage tank 2.

After placement of the shell 12, the upper end of the water connection 3-4 and the flue gas duct or tube 11a are sealed in any suitable manner. In the illustrated embodiment of the invention, a simple fiberglass cover 30 is provided on the respective elements. The top shell cover 14 is assembled to the upper end of the outer shell 12. The top shell cover 14 includes an injection opening 31 through which a foam insulation injection nozzle 32 may be readily extended into the cavity 22. A foamable insulation liquid 33, such as a polyurethane liquid, is injected from the nozzle under high pressure into the cavity 22, as diagrammatically shown in FIG. 7. The insulation is a generally two part liquified material stream which has an internal foaming agent such that upon discharge from the nozzle 32, the liquid begins to expand into foamed insulation 13. The foaming material also includes a hardening agent causing the material to harden into the solid insulating mass. The insulating stream 33 is normally introduced under pressures which may be of 3,000 psi, which drives the foaming material into all voids and interstices within the cavity 22 and results in a complete filling of the cavity. Such pressure also, however, tends to force the material through the interfaces 34 and 35 between the fiberglass belt 15 and the adjacent walls of tank 2 and shell 12. Although the pressure may be reduced to a level such as 2,300 si and minimize the tendency of the material to move past the interfaces, the high pressure application is desirable to promote efficient foaming and generation of an optimum insulation 13. To minimize and essentially avoid the difficulty with respect to movement of the insulation through the interfaces, the high pressure liquified insulation material 33 should be injected into the cavity with a buffering means, and thus without transmission of the full force onto the fiberglass belt 15 as such. The injection nozzle 32 may be mounted for example to direct the insulation material 33 onto the wall of the storage tank 2, as shown at 36 in FIG. 7, thereby minimizing the pressure of the liquid material 33 applied to the fiberglass belt 15. Other systems including those disclosed in the inventor's previously identified application may also be used.

The foaming insulation 33 is thus introduced from the nozzle 32 and fills the cavity from the bottom end upwardly to completely fill the cavity between the shell 12 and the storage tank 2 and between the top cover and the storage tank 2. The result is a total encasement of the storage tank above the belt, with the exception of the water and flue connection.

Further, the belt is preferably attached to the tank, such as shown but may of course be otherwise attached and within the broadest concept may be separately introduced, or secured to the interior of the shell with appropriate guide means to permit subsequent assembly with the tank. The illustrated method of attaching to the storage tank is desired as providing maximum ease of fabrication and assembly. As used herein, the terminology "compressible", "compress" and other derivatives of such terms in describing the illustrated belt unit includes not only materials which can in fact be technically compressed but other materials which provide a similar functioning as a result of deformation and the like. Thus, with the present method, the basic requirement is such that the guide means can force movement of the dam unit to reduce the diameter and permit the necessary movement of the shell over the dam unit.

The present invention, with the use of the compressible belt unit, provides an inexpensive but reliable system for establishing the bottom dam or wall for trapping the cavity-filling insulation and which is particularly adapted to mass production of hot water heater units.

Various modes of carrying out the invention are contemplated as being within the scope of the appended claims particularly pointing out and distinctly claiming the subject matter which is regarded as the invention.

I claim:

1. A method of manufacturing a storage unit having an inner tank and an intermediate insulation and an outer shell spaced from said storage tank by said insulation, said insulation spanning the space and engaging the opposed walls of the tank and shell, comprising
    attaching a compressible belt means to the inner tank,
    placing a flexible guide means formed of a flexible material over said belt means prior to assembly of the shell for deflecting said belt means inwardly,
    moving the outer shell over said inner tank and flexible guide means and said belt means to compress the belt means and at least partially form a cavity between said opposed walls of said shell and tank for said insulation with said belt means defining a bottom wall sealing the cavity, and
    filling said cavity defined by said inner tank, said belt means and said outer shell with a fluid insulation and hardening said insulation to form a rigid insulation about said inner tank.

2. The method of claim 1 including the step of removing said guide means before the step of filling said cavity.

3. The method of claim 1 including forming said belt from a multi-layered fiberglass and having the layers of said fiberglass parallel to the wall of said inner tank.

4. The method of claim 3 including clamping said fiberglass belt within said cavity by applying a clamping band about a central portion of said belt and compressing said belt into clamping abuttment to one of said walls, wherein opposite sides of said belt flaring outwardly from said one wall upon said compressing of said belt.

5. The method of claim 1 including introducing said insulation under pressure.

6. The method of claim 1 wherein said internal tank has a top, bottom and sidewall portions and said outer shell has top and sidewall portions and an open bottom, the sidewall portions of said shell extending below the bottom of said storage tank about a space beneath said storage tank for a fuel-burner arrangement, and securing said belt about the periphery of said storage tank above the bottom of said tank to locate said bottom sealing wall for said cavity above said space.

7. The method of claim 1 wherein said guide means is a sheet like member draped over said inner tank and extended downwardly to at least cover said belt means.

8. A method of manufacturing a hot water heater unit having an inner tank and an intermediate expanded foam insulation and outer shell spaced from said storage tank by said insulation, comprising forming a multi-layered compressible fibrous belt means about the wall of said inner tank, draping a flexible single piece guide apron formed of flexible plastic having smooth surfaces and having a central portion over the top end of said tank having opposite sides extending from the central portion over said belt means, moving the shell over the tank and flexible guide apron to compress the belt means and define a cavity between the tank and shell, manually removing the flexible apron from said tank, and introducing a foaming insulation nozzle into said cavity and introducing foaming insulation material under pressure to fill the cavity defined by said internal tank, said belt and said outer shell.

9. The method of claim 8 including buffering the flow of said foaming insulation to prevent direct application to said belt.

10. The method of claim 9 including injecting the foaming insulation material under pressure of about at least 3,000 psi.

11. The method of claim 9 wherein said buffering includes injecting said foaming insulation onto a fixed surface to absorb the injection pressure, said fixed surface allowing said foaming insulation material to flow therefrom into engagement with the surfaces of said belt, tank and shell and to fill said cavity.

12. The method of claim 8 wherein the step of a forming the belt includes tightening a clamping member about an intermediate portion of said belt and compressing said belt means into clamping abutment to said tank, the opposite ends of said belt means being flared outwardly from said one wall.

13. The method of claim 8 including removing said apron prior to introducing said foaming insulation.

14. The method of claim 8 wherein the step of forming the belt includes clamping said belt means to said inner tank with the central portion compressed against said storage tank.

15. The method of claim 8 wherein said inner tank has a top, bottom and sidewall portions and said outer shell has top and sidewall portions and an open bottom the sidewall portions of said shell extending below the bottom of said storage tank, water temperature sensing means secured to the sidewall of said inner tank adjacent the bottom wall of said inner tank, and securing said belt means above said sensing means.

16. A method of fabricating a fuel fired hot water heater, comprising securing a compressible wall means about a storage tank, manually draping a flexible single sheet member formed of a thin plastic material over the storage tank and compressible wall means, moving an outer tubular shell over said sheet member, said shell having a lesser internal diameter than the diameter of said wall means, whereby said shell compresses said wall means, and manually removing said sheet member.

17. The method of claim 16 wherein said sheet member has a central narrow neck portion and laterally enlarged outer end portions, said shell wrapping said end portions about said tank and said wall means.

18. The method of claim 17 wherein said neck portion is joined to said outer end portions by inclined portion and promoting the wrapping of the sheet member about said compressible wall means.

19. The method of claim 16 wherein said sheet member is formed of a plastic having smooth surfaces.

* * * * *

UNITED STATES PATENT AND TRADEMARK OFFICE
CERTIFICATE OF CORRECTION

PATENT NO. : 4,749,532

DATED : June 7, 1988

INVENTOR(S) : John D. Pfeffer

It is certified that error appears in the above-identified patent and that said Letters Patent is hereby corrected as shown below:

Col. 10, line 9, after "bottom" insert ---,---(comma).

Signed and Sealed this

Twenty-sixth Day of March, 1991

Attest:

HARRY F. MANBECK, JR.

*Attesting Officer*        *Commissioner of Patents and Trademarks*